(12) United States Patent
Holzer et al.

(10) Patent No.: US 9,726,900 B1
(45) Date of Patent: Aug. 8, 2017

(54) MAGNETICALLY LOCKING REVERSIBLE EYEWEAR AND METHOD OF REVERSING ORIENTATION OF SAME

(71) Applicant: Klar Scientific LLC, New York, NY (US)

(72) Inventors: Rafael Simcha Holzer, New York, NY (US); Marc-Aurélien Daniel Vivant, New York, NY (US)

(73) Assignee: Klar Scientific LLC, New York, NY (US)

( * ) Notice: Subject to any disclaimer, the term of this patent is extended or adjusted under 35 U.S.C. 154(b) by 0 days.

(21) Appl. No.: 15/272,401

(22) Filed: Sep. 21, 2016

(51) Int. Cl.
*G02C 5/14* (2006.01)
*G02C 5/00* (2006.01)
*G02C 5/20* (2006.01)
*G02C 5/22* (2006.01)

(52) U.S. Cl.
CPC ............. *G02C 5/001* (2013.01); *G02C 5/14* (2013.01); *G02C 5/143* (2013.01); *G02C 5/20* (2013.01); *G02C 5/22* (2013.01); *G02C 5/2254* (2013.01); *G02C 5/2263* (2013.01); *G02C 2200/02* (2013.01)

(58) Field of Classification Search
CPC ........ G02C 5/001; G02C 5/22; G02C 5/2254; G02C 5/2263; G02C 5/14; G02C 5/143
USPC ................................................. 351/115, 119
See application file for complete search history.

(56) References Cited

U.S. PATENT DOCUMENTS 3,049,974 A * 8/1962 Miwa ..................... G02C 5/006
351/115

| 4,787,731 | A | 11/1988 | Rogers | |
| 6,530,660 | B1 | 3/2003 | Chao | |
| 7,198,366 | B2* | 4/2007 | Gao | G02C 5/006 351/111 |
| 7,621,633 | B1 | 11/2009 | Foster | |
| 7,731,356 | B1* | 6/2010 | Gilbert | G02C 5/2263 16/228 |
| 7,886,405 | B2* | 2/2011 | Cescon | F16C 11/0604 16/224 |
| 2007/0177098 | A1* | 8/2007 | Lee | G02C 9/00 351/47 |
| 2007/0279580 | A1* | 12/2007 | Breda | G02C 5/006 351/115 |
| 2013/0114039 | A1* | 5/2013 | Zelazowski | G02C 5/2209 351/153 |

(Continued)

OTHER PUBLICATIONS

Long Tran, "Like Jekyll and Hyde", Yanko Design, Nov. 19, 2007, http://www.yankodesign.com/2007/11/19/switch-glasses/.

*Primary Examiner* — William R Alexander
(74) *Attorney, Agent, or Firm* — Robert J. Hess; Hess Patent Law Firm

(57) ABSTRACT

Reversible orientation eyewear for which each of the temple arms moves from an initial orientation relative to the lens frame to a reverse orientation relative to the lens frame by undergoing movements that include rotating a locking piece from the one of the two relative positions to the remainder of the two relative positions and thereby becoming free of magnetic attraction by the magnetically attractive elements; pivoting the temple arms about associated ones of the two ends of the lens frame; and rotating the locking piece from the remainder of the two relative positions to the one of the relative positions to restore magnetic attraction by the magnetically attractive elements.

4 Claims, 5 Drawing Sheets

(56) References Cited

U.S. PATENT DOCUMENTS

| | | | |
|---|---|---|---|
| 2013/0155369 A1* | 6/2013 | Chen | G02C 5/006 |
| | | | 351/115 |
| 2015/0049292 A1* | 2/2015 | Wilson | G02C 11/10 |
| | | | 351/51 |
| 2015/0055079 A1 | 2/2015 | Holzer et al. | |
| 2015/0168741 A1* | 6/2015 | Esmaeili | G02C 5/001 |
| | | | 351/115 |
| 2015/0219930 A1* | 8/2015 | Cohn | G02C 5/2263 |
| | | | 351/59 |

* cited by examiner

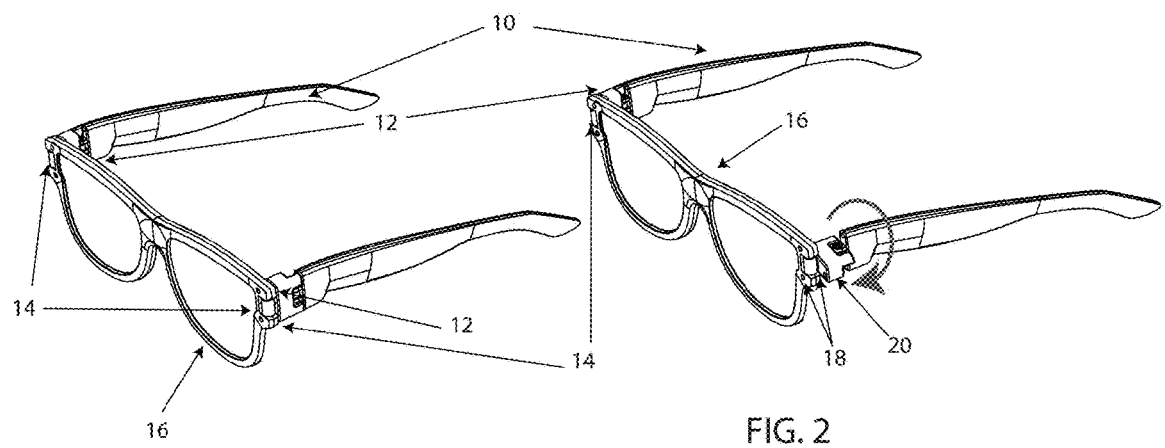
FIG. 1
FIG. 2
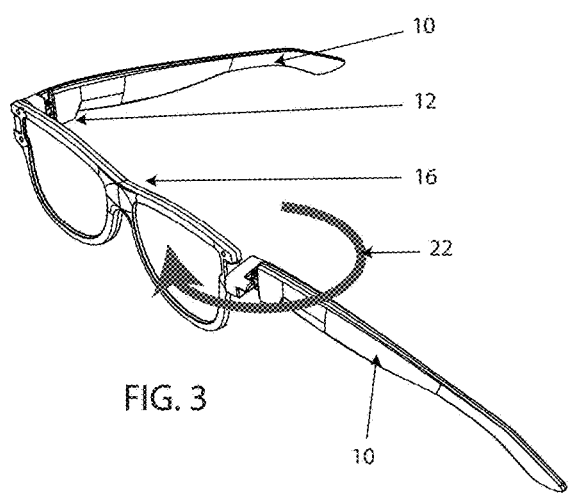
FIG. 3
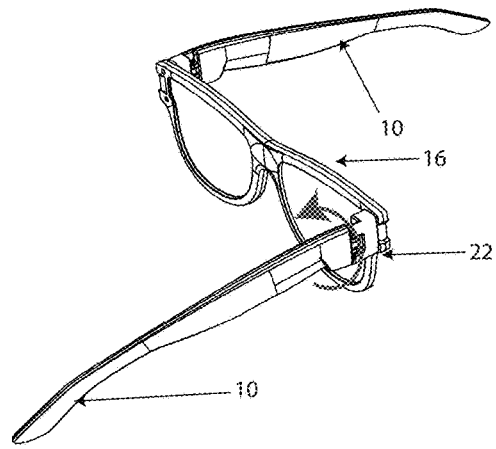
FIG. 4

MAGNETICALLY LOCKING REVERSIBLE EYEWEAR AND METHOD OF REVERSING ORIENTATION OF SAME

BACKGROUND OF THE INVENTION

Field of the Invention

The invention relates to reversible eyewear worn about the head and a method of reversing an orientation of the temple arms relative to the lens frame with hinge units.

Discussion of Related Art

Reversible eyewear has known advantages where the opposite sides of the temple arms bear different designs from each other to give a different look or appearance. Being fully reversible, eyewear that has a professional look can be worn to the office or an important business meeting and with a simple manipulation of the temple arms flipped to reveal a fun design that can be worn in more casual setting. The term reversible eyewear is worn about the head, namely, eyeglasses, sunglasses, prop glasses, eyeshields, goggles, safety glasses and combinations of these, provided they have temple arms that are attached in a manner that renders them reversible in their orientation relative to the lenses.

U.S. Pat. No. 6,530,660 to Chao et al. discloses eyeglasses provided with at least one reversible arm that can be manipulated to fold in towards the outer (front) face of the lens retaining portion of the frame, thereby covering it. The arm can be attached to the frames in a variety of ways. For instance, the attachment can be mechanical, or magnetism may be employed in fixing the arm to the frame. Several structural arrangements are described that permit reversal of the arm from a position behind the lens retaining portion of the frame to a position in front thereof. The arm can then be folded to cover the front and back sides of the lenses.

U.S. Pat. No. 4,787,731 to Rogers discloses a reversible eyeglass structure having an ear piece support assembly pivotally connected through a hinge connector assembly to an eyeglass frame assembly. The eyeglass frame assembly resembles a normal eyeglass assembly except that the glass sections and the main frame assembly are extended in parallel planes so that the eyeglass lens can be view through reversed directions and a nose bridge member can be used on a person's nose portion in opposite directions. The ear piece support assembly includes a pair of ear piece support members which are constructed in half sections with exterior surfaces of different colors and/or designs. The ear piece support members are pivoted 180 degrees to effectively present two sets of different appearing eyeglass wear in the one reversible eyeglass structure. The hinge connector assembly provides for ear piece and frame connector assemblies interconnected by a pin connector assembly and including biasing means to hold the ear piece support members in both usage conditions.

U.S. Pat. No. 7,621,633 to Foster reveals a modular eyeglass frame device that may be used to selectively alter the appearance of the eyeglass frames for many different reasons and is produced in an array of colors and styles so that users enjoy interchanging several pairs of the present invention to correspond with particular outfits, occasions and moods. Being fully reversible, a pair of professional looking eyewear can be worn to the office or an important business meeting and with a simple manipulation of the ear pieces is flipped to reveal a fun design perfect for cocktails or an evening out with friends.

In an article by Long Tran on Nov. 19, 2007 entitled "LIKE JEKYLL AND HYDE", Hyo-Jong Kim is mentioned as a designer for Switch Glasses by Yanko Design. The Switch Glasses' design adds pivots and hinges to the arms and lens of a pair of glasses. By flipping them around, one can take advantage of two different frame colors. That is, users can wear with two colors by spinning rims and bows (arms) of eyeglasses. The bows (arms) of the eyeglasses can be spun 180 degrees through the end pieces and can switch the lens by spinning of the rims.

It is desired to devise an alternative hinge mechanism to facilitate reversing the orientation of temple arms relative to the lens frame that enables retention of the temple arms in either of the reversible orientations under magnetic force.

SUMMARY OF THE INVENTION

One aspect of the invention resides in reversible eyewear that has a lens frame, a pair of temple arms and a pair of hinge units. The hinge units connect the pair of temple arms to opposite ends of the lens frame, which is elongated between the opposite ends. The hinge units and the opposite ends of the lens frame have magnetically attracted elements, such as at least one magnet Each hinge unit has a respective locking piece that is rotatable between two relative positions.

In one of the relative positions, the magnetically attracted elements attract each other so as to magnetically retain the temple arms to the lens frame against relative movement. In the other of the relative positions, the magnetically attracted elements are clear of magnetic attraction to each other and thus cease retaining the temple arms to the lens frame against relative movement. Each of the locking pieces may be rotated about an associated axis to move between the two relative positions.

When the locking pieces are moved from the one relative position to the other relative position where the magnetically attracted elements are clear of their magnetic attraction to each other, the temple arms may pivot about the end of the lens frame to reverse the orientation with respect to the lens frame and then the locking piece may be rotated back in the opposite direction to reach the relative position at which the magnetically attracted elements once again are in magnetic attraction with each other to retain the temple arms in the reverse orientation.

BRIEF DESCRIPTION OF THE DRAWING

For a better understanding of the present invention, reference is made to the following description and accompanying drawings, while the scope of the invention is set forth in the appended claims.

FIG. 1 is an isometric view of eyewear with a locking piece in a magnetically locked position in accordance with the invention.

FIG. 2 is an isometric view of eyewear with a locking piece in a magnetically unlocked position in accordance with the invention.

FIG. 3 is an isometric view of eyewear with a temple arm in a pivoted position in accordance with the invention.

FIG. 4 is an isometric view of eyewear with a temple arm in a reversed position from that of FIG. 2 and the locking piece in a magnetically unlocked position in accordance with the invention.

DESCRIPTION OF THE PREFERRED EMBODIMENT

Figure 5:
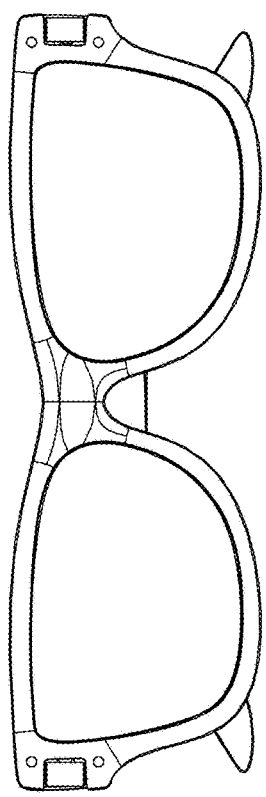
FIGS. 5, 6 and 7 are respectively a front view, a top view and an isometric view of the eyewear of FIG. 1 with both temple arms in a rear folded position.
Figure 6:
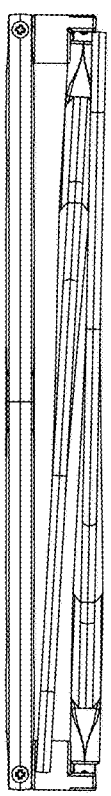
Figure 7:
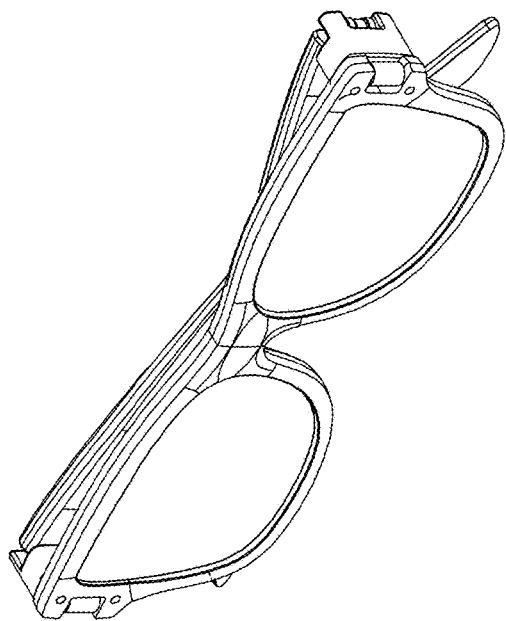
Figure 8:
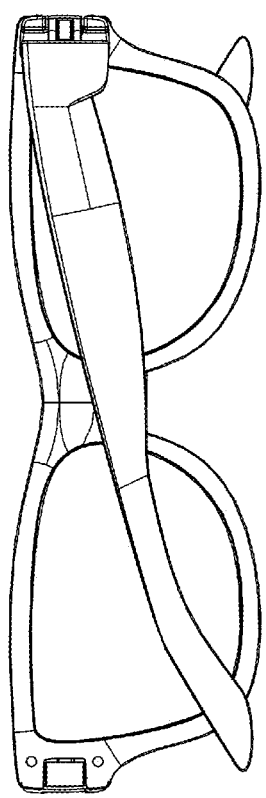
FIGS. 8, 9 and 10 are respectively a front view, a top view and an isometric view of the eyewear of FIG. 1 with one temple arm in a rear folded position and another temple arm in a front folded position.
Figure 9:
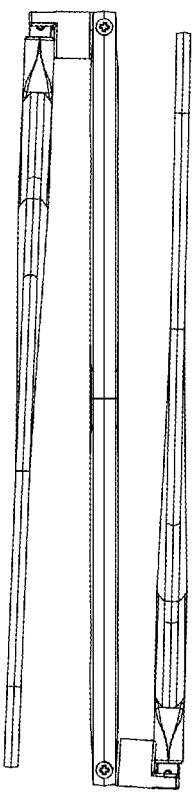
Figure 10:
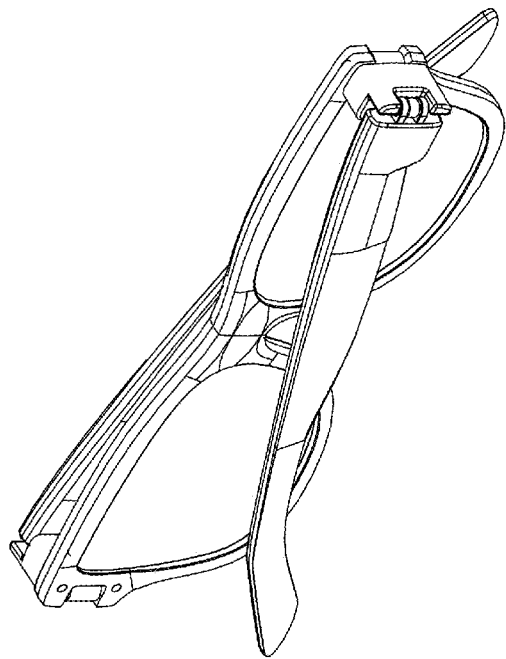
Figure 11:
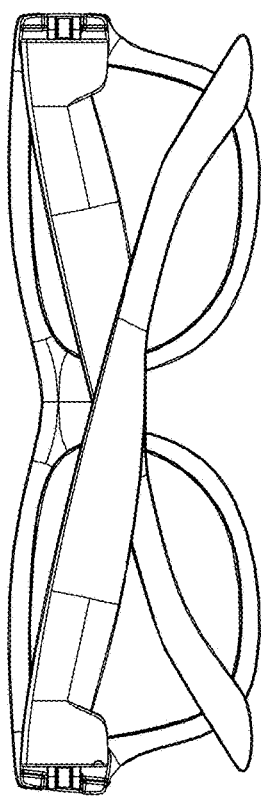
FIGS. 11, 12 and 13 are respectively a front view, a top view and an isometric view of the eyewear of FIG. 1 with both temple arms in a front folded position.
Figure 12:
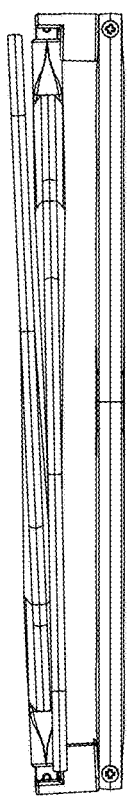
Figure 13:
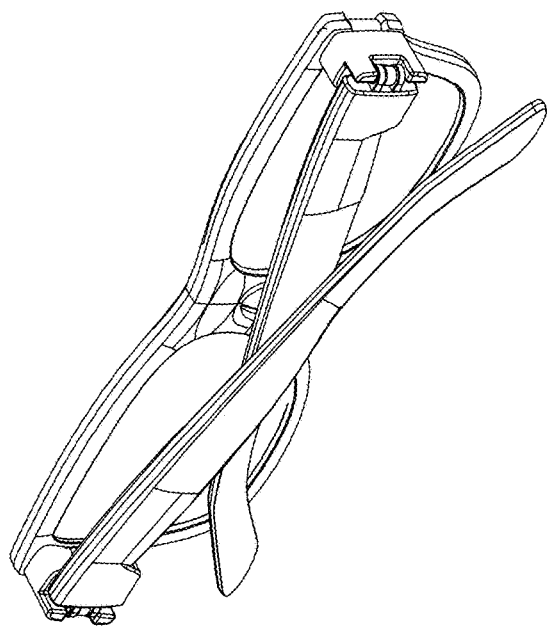

Turning to the drawing, FIGS. 1-4 show progressive views of the eyewear in accordance with the invention. The eyewear includes two temple arms 10, two hinge units 12, two opposite ends 14 of a lens frame 16 that has a magnetically attractive element 18. Each hinge unit 12 has a rotatable locking piece 20, which likewise has a magnetically attractive element 18. The locking piece 20 of FIG. 1 may be rotated clockwise from its relative position (where the magnetic attractive elements 18 are attracted to each other in a magnetically locked position) to reach the relative position of FIG. 2 (where the magnetically attractive elements 18 are clear of each other in a magnetically unlocked position and thus cease to be in magnetic attraction with each other).

FIG. 1 shows the temple arms in their initial orientation. In order to reverse the orientation of the temple arms relative to the lens frame, the following manual operation is performed. First, the rotatable locking piece 20 is rotated to disengage the magnetic attraction of the magnetic elements 18 in the end 17 of the lens frame and in the locking piece 18. The hinge units 12 may permit the respective rotatable locking pieces 20 to be manually rotated, preferably clockwise or counterclockwise as desired.

From the position of FIG. 2, the temple arms 10 are pivoted or flipped about the opposite ends 14 of the lens frame 14 (see FIG. 3) in the direction of arrow 22 to reach the reversed position of FIG. 4. The locking piece 20 is then rotated back in the opposite direction from before to reach the magnetically locking position at which the magnetically attractive elements magnetically attract each other.

FIGS. 5-7, 8-10 and 11-13 depict three different ways that the eyewear may have its temple arms 10 folded relative to the lens frame 16. Both of the temple arms 10 may be folded to the rear of the lens frame 16 or be alternated between the front and rear of the lens frame 16 or both folded in front of the lens frame 16.

Figure 14:
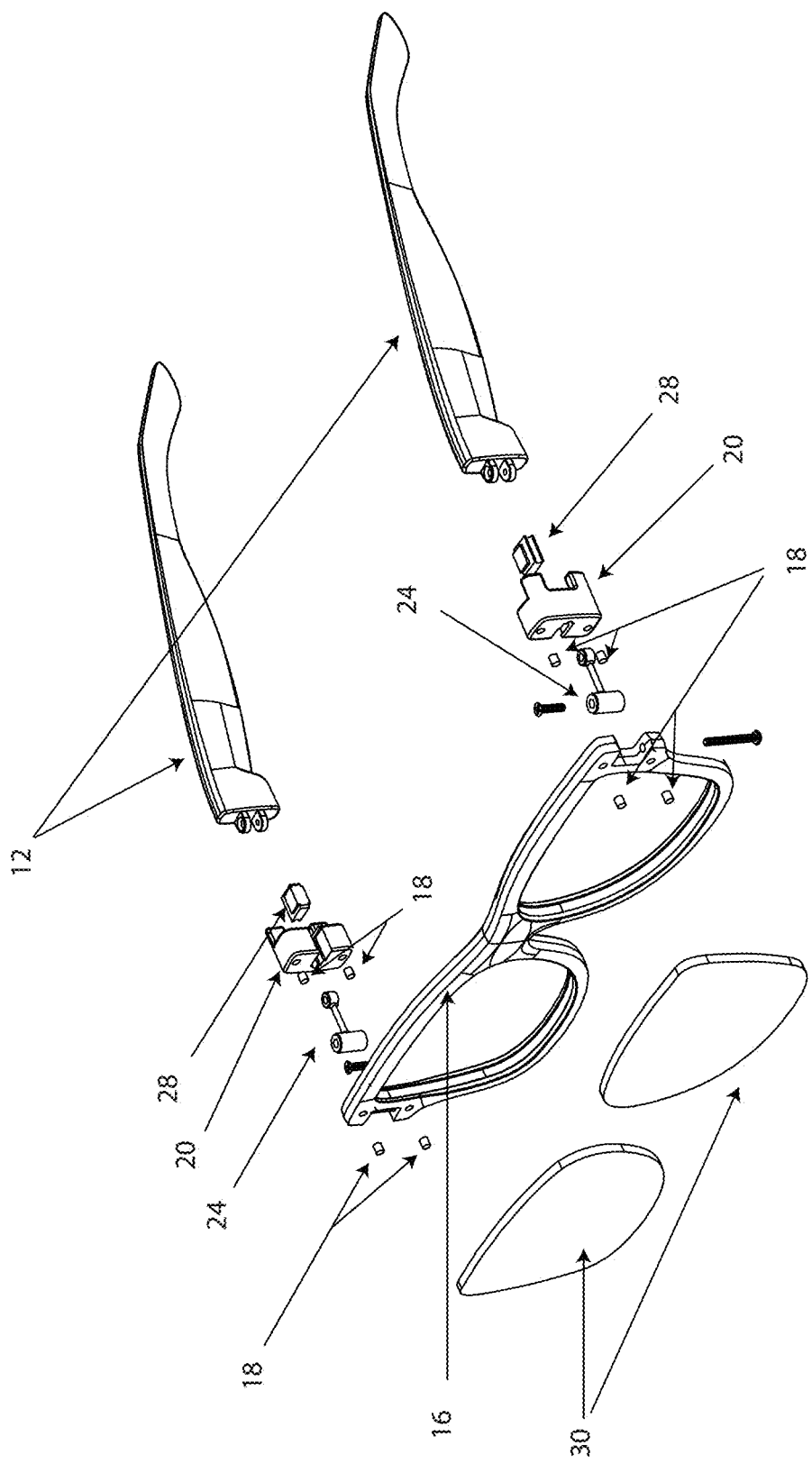
FIG. 14 is an isometric, exploded view of the eyewear of FIG. 1.

FIG. 14 shows the eyewear assembly that includes the lens frame 16 into which is fitted lenses 30 in a conventional manner. The temple arms 10 connect to ends of the lens frame via hinge units. Each hinge unit includes a hinge piece 24, the locking piece 20 and a link piece 28 as well as a pair of magnets that lock the hinge piece in place by coupling with a complementary pair of magnets in frame 16. The hinge piece 24 is connected to the end of the lens frame in a conventional manner with conventional fasteners and is connected to the link piece 28 such that the locking piece 20 is freely rotatable on the hinge piece 24. The link piece 28 is connected to the temple arm 10 in a conventional manner.

The material for the magnetically attractive elements 18 may be of any magnetically attractive material such as those found in conventional permanent magnets. For instance, www.coolmagnetman.com provides a discussion about conventional permanent magnets of different types (any of which may serve as the magnetically attractive elements 18 of the present invention):

There are four classes of permanent magnets:
Neodymium Iron Boron (NdFeB or NIB)
Samarium Cobalt (SmCo)
Alnico
Ceramic or Ferrite
Br is the measure of its residual magnetic flux density in Gauss, which is the maximum flux the magnet is able to produce. (1 Gauss is like 6.45 lines/sq in)
Hc is the measure of the coercive magnetic field strength in Oersted, or the point at which the magnet becomes demagnetized by an external field. (1 Oersted is like 2.02 ampere-turns/inch)
BHmax is a term of overall energy density. The higher the number, the more powerful the magnet
Tcoef of Br is the temperature coefficient of Br in terms of % per degree Centigrade . . . —how the magnetic flux changes with respect to temperature. —0.20 means that if the temperature increases by 100 degrees Centigrade, its magnetic flux will decrease by 20%!
Tmax is the maximum temperature the magnet should be operated at. After the temperature drops below this value, it will still behave as it did before it reached that temperature (it is recoverable). (degrees Centigrade)
Tcurie is the Curie temperature at which the magnet will become demagnetized. After the temperature drops below this value, it will not behave as it did before it reached that temperature. If the magnet is heated between Tmax and Tcurie, it will recover somewhat, but not fully (it is not recoverable).
(degrees Centigrade)
(please note that this data is from www.magnetsales.com)

| Material | Br | Hc | BHmax | Tcoef of Br | Tmax | Tcurie |
| --- | --- | --- | --- | --- | --- | --- |
| NdFeB | 12,800 | 12,300 | 40 | −0.12 | 150 | 310 |
| SmCo | 10,500 | 9,200 | 26 | −0.04 | 300 | 750 |
| Alnico | 12,500 | 640 | 5.5 | −0.02 | 540 | 860 |
| Ceramic or Ferrite | 3,900 | 3,200 | 3.5 | −0.20 | 300 | 460 |

Both the Neodymium Iron Boron and the Samarium Cobalt magnets are generally known as rare earth magnets since their compounds come from the rare earth or Lanthanide series of the periodic table of the elements . . . . As can be seen in the table, these are the strongest of the permanent magnets, and are difficult to demagnetize. However, the Tmax for NdFeB is the lowest.
Alnico is made of a compound of aluminum, nickel and cobalt . . . . As can be seen in the table, this magnet is least affected by temperature, but is easily demagnetized . . . . Its Tmax, though, is the highest.
Ceramic or Ferrite magnets are the most popular types of magnets available today. The flexible magnets . . . are a type of ceramic magnet, with the magnetic powders fixed in a flexible binder . . . . This is a fairly strong magnet, not as easy to demagnetize as alnico, but its magnetic strength will vary the most as its temperature changes.
Shapes
Permanent magnets can be made in most any shape imaginable. They can be made into round bars, rectangular bars, horseshoes, rings or donuts, disks, rectangles, multi-fingered rings, and other custom shapes. Some are cast into a mold and require grinding to achieve final dimensions. Others start as a powder which is pressed into a mold or pressure bonded or sintered.
An online published article by INSIDER discusses the sunglasses in accordance with the invention and discusses one of the inventors. The article was written by Talia Kakritz an published on Aug. 29, 2016 at www.thisisinsider.com. The article reads as follows:

> A 27-year-old reinvented the way we wear sunglasses by adding a simple hinge. Peeq sunglasses are built with a reversible hinge to show off both sides of the design—and the person wearing them.
>
> When Raffi Holzer isn't working as a general manager at FranchiseHelp, he's managing his own burgeoning enterprise: reversible sunglasses.
>
> Plain on one side and patterned on the other, Peeq sunglasses are built with a reversible hinge that allows them to be worn either way.
>
> The idea originated in Holzer's product design class at the University of Pennsylvania as part of an assignment to rethink an everyday design. He saw a pair of plain black sunglasses on his desk, then spotted someone across the room wearing a bright electric blue pair.
>
> "I'm a mechanical guy and I'm thinking, 'There's got to be a way to flip them around and have the design on either side,'" the 27-year-old told INSIDER. "I've seen glasses that have designs on either side. Why can't you have a hinge that just allows you to wear them both ways?"
>
> He started by cutting up 3D movie glasses and pasting them back together, then eventually designed a reversible hinge. He put a provisional patent on the mechanism, but left the idea alone for a year and a half until his girlfriend (now his wife) and her family encouraged him to pursue it.
>
> "1 showed my now father-in-law the idea, and he was like, 'You have to patent this,'" Holzer said. "I was like, 'If there's really interest, maybe I should actually follow through and start doing something about this.'"
>
> The glasses may look effortlessly sleek now, but it took some time to get them right.
>
> "There were a huge number of challenges in terms of trying to get a pair of glasses that would be reversible and also fit like a normal pair of glasses would," he said. "I think we've basically gotten there, and the next step is really just getting them into production."
>
> Holzer hopes that Peeq's versatile frames will allow wearers to express different facets of themselves.
>
> "There's a lot of wasted beauty in the world," said Holzer, citing decorative jacket linings that are rarely displayed.
>
> "I think every person has at least two sides to them, and why not have an accessory that can be expressive of both of those?" he said. "There are situations in which you want to be more conservative and there are situations in which you want to go wild, and this pair of glasses allows you to do both of those through one accessory."
>
> The sunglasses will retail for around $60, with a forthcoming Indiegogo campaign to jumpstart development.
>
> "This is a learning process for me, certainly, and it's hopefully a collaborative and artistic process, as well as a business enterprise," he said.

While the foregoing description and drawings represent the preferred embodiments of the present invention, it will be understood that various changes and modifications may be made without departing from the scope of the present invention.

What is claimed is:

1. Reversible orientation eyewear, comprising:
    a lens frame that is elongated between two ends;
    a pair of temple arms;
    a pair of hinge units connecting the pair of temple arms to the two ends respectively so as to give rise to the temple arms having an initial orientation relative to the lens frame, the pair of hinge units and the two ends having magnetically attractive elements with at least one of the magnetically attractive elements being a magnet, the pair of hinge units each having a respective locking piece rotatable between two relative positions, the magnetically attractive elements attracting each other magnetically as the locking piece resides in one of the two relative positions and ceasing to attract each other magnetically as the locking piece resides in a remainder of the two relative positions, the pair of hinge units being formed to enable the temple arms to pivot about the two ends respectively provided the respective locking pieces reside in the remainder of the two relative positions so as to reverse an orientation of the temple arms relative to the lens frame from that of the initial orientation,
    wherein each of the temple arms is configured to undergo movements to reposition from the initial orientation relative to the lens frame to the reversed orientation relative to the lens frame, the movements include:
    rotating the locking piece from the one of the two relative positions to the remainder of the two relative positions and thereby become free of magnetic attraction by the magnetically attractive elements;
    pivoting the temple arms about associated ones of the two ends of the lens frame; and
    rotating the locking piece from the remainder of the two relative positions to the one of the relative positions to restore magnetic attraction by the magnetically attractive elements.

2. The reversible orientation eyewear of claim 1, wherein each of the hinge units includes a hinge piece about which the locking piece is rotatable and a link piece that connects the hinge piece to associated ones of the temple arms.

3. A method of reversing orientation of eyewear, comprising:
    connecting a pair of temple arms to two ends respectively of a lens frame by a pair of hinge units so as to give rise to the temple arms having an initial orientation relative to the lens frame, the lens frame being elongated between the two ends, the pair of hinge units and the two ends having magnetically attractive elements with at least one of the magnetically attractive elements being a magnet, the pair of hinge units each having a respective locking piece rotatable between two relative positions;
    attracting the magnetically attractive elements to each other magnetically as the locking piece resides in one of the two relative positions;
    ceasing the magnetically attractive elements from attracting to each other magnetically as the locking piece resides in a remainder of the two relative positions; and
    pivoting the temple arms about the two ends with the pair of hinge units provided the respective locking pieces reside in the remainder of the two relative positions so as to reverse an orientation of the temple arms relative to the lens frame from that of the initial orientation,
    wherein each of the temple arms undergo movements to reposition from the initial orientation relative to the lens frame to the reversed orientation relative to the lens frame, the movements include:
    rotating the locking piece from the one of the two relative positions to the remainder of the two relative positions and thereby become free of magnetic attraction by the magnetically attractive elements;
pivoting the temple arms about associated ones of the two ends of the lens frame; and
rotating the locking piece from the remainder of the two relative positions to the one of the relative positions to restore magnetic attraction by the magnetically attractive elements.

4. The method of claim 3, wherein each of the hinge units includes a hinge piece about which the locking piece is rotatable and a link piece that connects the hinge piece to associated ones of the temple arms.

* * * * *